US007480370B2

(12) United States Patent
Pinault

(10) Patent No.: US 7,480,370 B2
(45) Date of Patent: Jan. 20, 2009

(54) DEVICE FOR THE MANAGEMENT OF COMMUNICATIONS BY THE SELECTION OF TERMINALS AND THE COMMUNICATION MEDIUM

(75) Inventor: Francis Pinault, Bois-Colombes (FR)

(73) Assignee: Alcatel, Paris (FR)

( * ) Notice: Subject to any disclaimer, the term of this patent is extended or adjusted under 35 U.S.C. 154(b) by 1066 days.

(21) Appl. No.: 10/780,717

(22) Filed: Feb. 19, 2004

(65) Prior Publication Data

US 2004/0165714 A1 Aug. 26, 2004

(30) Foreign Application Priority Data

Feb. 25, 2003 (FR) .................................. 03 02264

(51) Int. Cl.
*H04M 11/00* (2006.01)
*H04L 12/66* (2006.01)
(52) U.S. Cl. ............... 379/93.09; 379/90.01; 379/93.05
(58) Field of Classification Search ............. 379/93.05, 379/90.01, 93.07, 93.08, 93.09; 370/351, 370/352, 356, 385, 392, 401, 402, 400, 420, 370/466; 709/220, 223, 228
See application file for complete search history.

(56) References Cited

U.S. PATENT DOCUMENTS

| 5,790,647 | A * | 8/1998 | Gessel .................... 379/216.01 |
| 6,363,065 | B1 * | 3/2002 | Thornton et al. ............. 370/352 |
| 6,470,008 | B1 * | 10/2002 | Khuc .......................... 370/352 |
| 6,775,269 | B1 * | 8/2004 | Kaczmarczyk et al. ...... 370/352 |
| 7,024,480 | B2 * | 4/2006 | Weik ........................... 709/227 |
| 2003/0021259 | A1 | 1/2003 | Miloslavsky et al. |
| 2003/0135624 | A1 * | 7/2003 | McKinnon et al. .......... 709/228 |

FOREIGN PATENT DOCUMENTS

JP 07264298 A * 10/1995

OTHER PUBLICATIONS

Horvitz; System and method for identifying . . . preferences and contexts; Sep. 26, 2002; WO02/075495A2.*
Mmusic WG: Handley et al, "draft-ietf-sip-rfc2543bis-00.ps—SIP: Session Initiation Protocol" Internet Engineering Task Force, Jun. 5, 2000, pp. 1-129, XP002164649.
J-F Rey et al, "SIP Technology in the Enterprise: SIP technology will be the next step in IP telephony, bringing new Internet telephony services to enterprise users", Alcatel Telecommunications Review, Alcatel, Paris, France, Oct. 2002, XP007005899.
T. Sens "Next Generation of Unified Communication for Enterprise: New communication applications that are accessible on any device are helping businesses to be more competitive in the age of the borderless enterprise" Alcatel Telecommunications Review, Alcatel, Paris France, Oct. 2002, XP007005900.

* cited by examiner

*Primary Examiner*—Melur Ramakrishnaiah
(74) *Attorney, Agent, or Firm*—Sughrue Mion, PLLC

(57) ABSTRACT

A device is dedicated to the management of communications between communication terminals (TMi, TFi and PCi). This device includes a memory (M) which stores user identifiers in correspondence with lists of at least one communication terminal identifier, and processing means (PM) which are charged, when they receive a call request to a user, known as the called user, from another user, known as the calling user, to access the memory (M) in order to extract from it the lists of identifiers associated with the calling and called users, and then to determine, from these extracted lists, a calling and a called terminal which are likely to establish a call between them that will satisfy the call request, in accordance with at least one availability criterion.

25 Claims, 1 Drawing Sheet

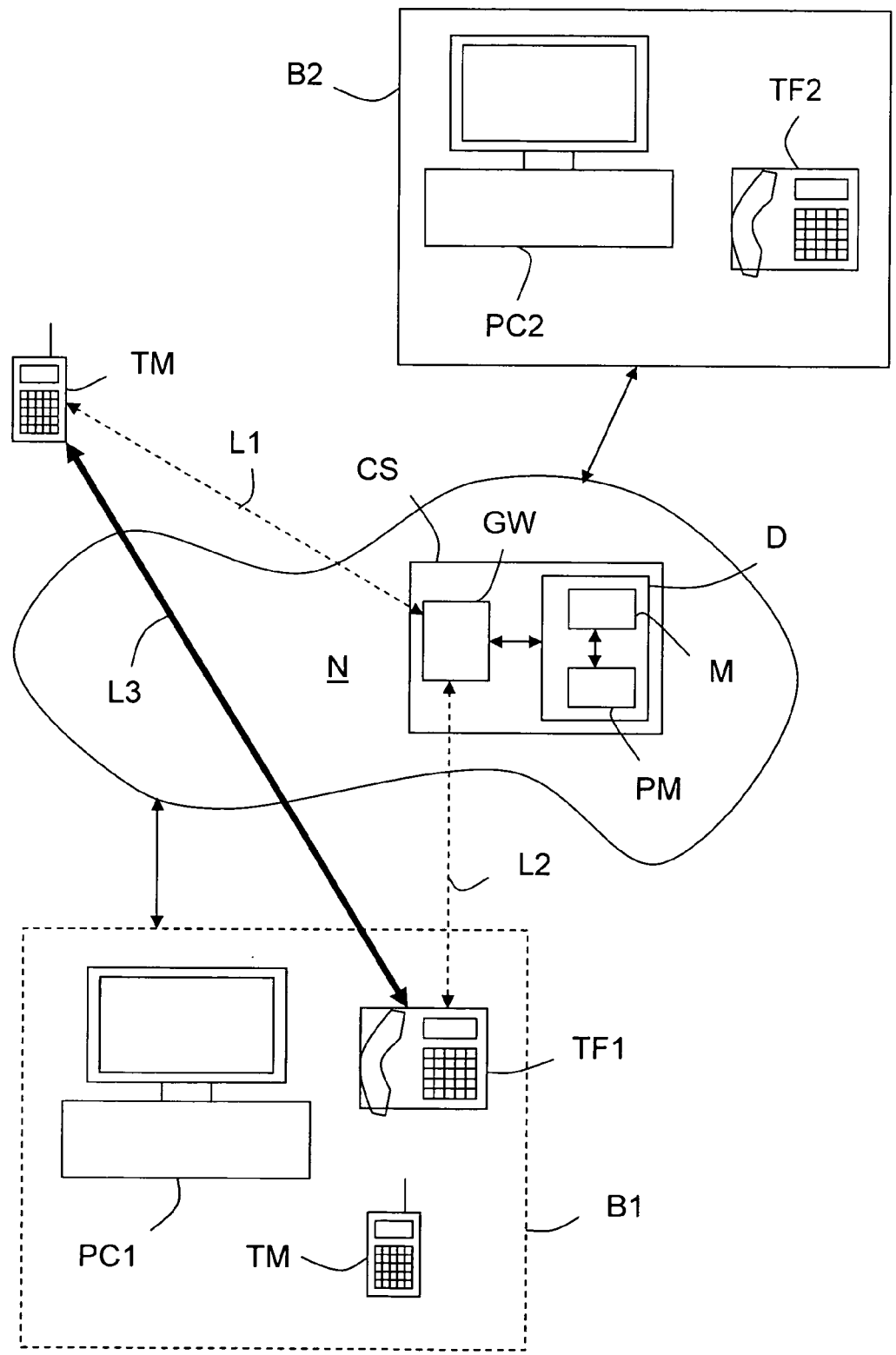
Figure unique

DEVICE FOR THE MANAGEMENT OF COMMUNICATIONS BY THE SELECTION OF TERMINALS AND THE COMMUNICATION MEDIUM

The invention concerns the area of communications between communication terminals, and more in particularly the establishment, by request, of communications or calls between communication terminals.

Nowadays, many people possess communication terminals of various types, providing services of different types (such as fixed or mobile telephony, for example, or telephone by Internet, transmission of text data, voice, fixed or moving images, or multimedia data). This is the case, in particular, within many companies which possess a private network.

Because of this situation, when a caller wishes to transmit data of a certain type directly to a called party, three conditions must be satisfied: the called party must be accessible, the caller and the called parties must simultaneously have terminals available and capable of exchanging data of the same type, as well as communication network resources, within which the call has to be established, which must be capable of handling the type of data to be exchanged, and which must be available.

Now when the caller decides to initiate a transmission, he generally does not know if these three conditions are satisfied simultaneously. He must therefore enter the terminal which he judges suitable for this transmission and then attempt to establish the call. In the event of a fruitless attempt, which is relatively frequent, the caller must manipulate the directories and/or establish one or more calls in order to determine the communication address of the terminal through which he can contact the called party. The calling party may also be constrained to use another type of terminal. Furthermore, once a connection has been established between a calling terminals and a called terminal, there is no guarantee that the caller can transmit his data to the called party, in particular when their respective terminals offer services of different types. Finally, even if the terminals allow a type of exchange to be handled, it is not certain that the network employed, though it can handle setting up of the call, will handle the transmission of the medium (such as two mobile telephones which can handle exchanges of the MMS type, but cannot exchange digital photographs because their network, of the GPRS/GPM type, does not have an MMS server). In other words, not only must the caller perform each operation manually, but he has no means of knowing whether his attempt has any real prospect of succeeding.

The purpose of the invention is therefore to remedy all or part of the above-mentioned drawbacks.

To this end, it proposes a DEVICE which is dedicated to the management of communications between communication terminals, at the request of calling users.

This device is characterised by the fact that it includes, firstly, a memory capable of storing user identifiers of users in correspondence with lists of at least one communication terminal identifier, and secondly, processing means which are charged, when they receive a call request from a user called by a calling user, to access the memory in order to extract the lists of terminal identifiers which are associated with the identifiers of calling and called users, and then to determine, from these extracted lists, a calling and a called terminal which are likely to establish a call between them that will satisfy the call request of the calling user, in accordance with at least one criterion of availability.

In this way, the management device determines if a connection can be established between the calling user and a called user, before any communication attempt is undertaken, and without the calling user having to do anything.

According to another characteristic of the invention, the processing means are preferentially charged to determine not only the calling and called terminals, but also the most suitable communication medium for these calling and called terminals. By "the most suitable communication medium" is meant here the medium which allows the transmission of the greatest number of different data types.

The management device according to the invention can be implemented in many ways, and possibly in various combinations, depending on the arrangement of its memory and its processing means, and in particular:

the processing means can be charged to effect their determination as a function of the state of availability of the calling and called terminals. In this case, the memory should preferentially be capable of storing the communication terminal identifiers in correspondence with the state of availability of the terminals.

the processing means can be charged to effect their determination as a function of the state of availability of the resources of the communication network within which the communication satisfying (at least in part) the requirement of the calling user must take place.

the processing means can be charged to effect their determination as a function of at least one other criterion, called the auxiliary criterion. Among these criteria, the following can be mentioned in particular:

the accessibility of the calling and/or called users. The processing means are then in charge of their determination in accordance with the accessibility of the users. In this case, the memory is preferentially capable of storing the user identifiers in correspondence with the state of availability of the users.

The preference of terminal use by a user. The processing means are then in charge of their determination in accordance with the preferences of terminal use by calling and/or called users. In this case, the memory is preferentially capable of storing the user identifiers in correspondence with a preference of terminal use.

The policy for terminal use and/or medium use by a company. In this case, the processing means are capable of effecting their determination as a function of the policy of use of the company with which the calling user and/or the called user are associated.

the communication quality level. The processing means are then in charge of their determination in accordance with information on quality level associated with the calling and/or the called users. In this case, the memory is preferentially capable of storing the user identifiers in correspondence with information representing a communication quality level.

a hierarchical level of the calling and/or called user within a company. The processing means are then in charge of their determination in accordance with information on the hierarchical level of the calling and/or called users. In this case, the memory is preferentially capable of storing the user identifiers in correspondence with information representing a hierarchical level within the company.

information on the geographical location of the calling and/or called user. The processing means are then in charge of their determination in accordance with the geographical locations of the calling and/or called user, and the topology of at least one communication network in which the communication is to take place. In this case, the memory is preferentially capable of storing the user identifiers in correspondence with information representing geographical location.

the availability of the communication network connection resources. The processing means are then in charge of their determination in accordance with information on the availability of the connection resources of at least one communication network in which the communication is to take place. The auxiliary criterion of availability of the connection resources can also be accompanied by an auxiliary criterion of the quality of the available connection resources and/or the cost of use of said connection resources.

the processing means can be in charge of transmitting data to the calling user which are representative of the medium determined for the communication.

after they have determined the calling and called terminals, the processing means can be charged to order the establishment of the call between the calling and called terminals. This order can be transmitted either automatically or following receipt of an authorisation from the calling and/or called user.

The processing means can also be arranged so as to determine another calling and/or called user, likely to establish another call between them which would satisfy the initial request of the calling user, and/or another communication medium in the event that it is impossible to establish the call.

The invention also concerns a call server for the communication network, which includes at least one management device of the type presented above.

Other characteristics and advantages of the invention will appear on examination of the detailed description below, and of the appended drawing, on which the single FIGURE schematically illustrates a communication network which is equipped with an example of implementation of a management device according to the invention. The appended drawing can not only be used to complete the invention but can also contribute to its specification, where appropriate.

The invention concerns the management of calls between calling and called users, at the request of the calling users, with a view to the direct transmission of data.

By "call" is meant here the establishment of a call or communication over at least one communication network, between a communication terminal of a calling user and a communication terminal of a called user, permitting said calling and called users to exchange one or more different types of data directly (video, audio or messaging data (text files, e-mail, and similar)).

The single FIGURE schematically represents a private company network (N), using an IP protocol for example. In this example, each user (Ui, where i=1 and 2) is associated with a company, and has an office (Bi) fitted with connectors which allow connection to the private network (N) of communication terminals, by wire or by wave transmission (of the infra-red or Bluetooth type for example).

Moreover, in this example, each user (Ui) has a mobile telephone (TMi), a fixed fax/telephone (TFi), and an individual computer (PCi). Each fax/telephone (TFi) is connected to the public switched telephone network (PSTN) via the private network (N). Each mobile telephone (TMi) is connected to a mobile telephone network (not shown), of the GSM/GPRS (or UMTS) type for example, to which the private network (N) is connected.

Of course, the invention is not limited only to private communication networks. It covers any type off communication network. Furthermore, the invention is not limited to the management of calls between users associated with a given company. It concerns any type of user, associated or not with a company. Finally, the invention is not limited only to users equipped with three communication terminals of different types. It concerns any user equipped with at least one communication terminal (but is it is obvious that the invention becomes more useful as the number of terminals associated with a given user increases).

The invention proposes a management device (D), installed in a call server (CS) for example, of the private network (N), preferentially equipped with an access gateway (GW) charged with negotiation of connections in accordance with a communication protocol such as a Session Initiation Protocol (SIP) for example.

The management device (D) includes a memory in which is stored a table of correspondence between at least user identifiers and lists of at least one communication terminal identifier. A user identifier is composed of data representing, for example, a name or an alphanumeric code. In addition, the list associated with a user includes communication identifiers for each of its communication terminals. A terminal identifier is, for example, a telephone number or an IP address.

The management device (D) also includes a processing module (PM) which is charged, each time that it receives a call request from a calling user (Ui) for a called user (Uj), to access the memory (M) in order to extract the two lists of terminals which are associated with the calling (Ui) and called (Uj) users. Once the two lists have been extracted, the processing module (PM) attempts to determine from them, in accordance with at least one availability criterion, a calling terminal and a called terminal which are likely to establish a call between them which will satisfy the request of the calling user (Ui).

The call request can be placed by the calling user (Ui) by any means whatever, such at by voice control or by the selection of a menu on one of the known terminals, or on an interactive terminal located in his company, and then by supplying a called user name (Uj), or its identifier, by voice or by keyboard entry or by selection from a directory. In the above cases, the user terminal or the interactive terminal knows the communication identifier of the call server (CS) in which DEVICE D is installed, in such a manner that it is able to automatically establish the connection to the latter. However, it is also possible to envisage that the calling user (Ui) will himself dial the communication identifier of the call server (CS) in which the management device (D) is installed, with one of its terminals for example, or with any other communication terminal, and then communicates to said management device (D) its own user identifier and the identifier of the user to be called, either by keyboard entry or by voice control.

Several availability criteria can be used, either separately or in combination. Among these availability criteria, one can mention, in particular the availability of terminals or the availability of resources of at least one of the communication networks within which communications can take place which satisfy the requirements of the calling user (Ui), or indeed the availability of memory resources of the calling terminal and/or the called terminal. Other availability criteria can also be envisaged, such as the computing time (CPU) necessary or the authorisation to exchange a data type in accordance with a safety policy in the form of a firewall.

When the processing module (PM) effects its determination in accordance in particular with the state of availability of the communication terminals contained in the lists associated with the calling users (Ui) and called users (Uj), it is preferable that said states of availability should be stored in the memory (M) in correspondence with the terminal identifiers.

However this is not compulsory. The processing module (PM) can, in fact, be arranged so as to determine this status information within the private network (N).

When the processing module (PM) effects its determination in accordance in particular with the state of availability of the network resources, it is preferable that it should determine this status information within the networks concerned. In fact, it is possible to envisage that the correspondence table, stored in the memory (M), contains, at all times, the availability state of the main network communication resources used by the terminals of the users whose identifiers are contained in said table.

Preferentially, the processing module (PM) determines not only the called and calling terminals but also the communication medium (or the CODEC—COder-DECoder) or the bearer which is best suited to these calling or called terminal, favouring in particular, where possible, that which allows transmission of the greatest number of different data types.

For example, a communication network dedicated to data exchange can be supported by a mobile telephone network of the conventional GSM type, with a data bearer at 9600 bauds, but it can also be supported by the same GSM network when it presents a GPRS bearer at higher speeds.

Here, the term "medium" means a communication medium or a codec or a bearer which is suitable for the transmission of audio or voice an/or video and/or text (text or messaging for example). "Medium" also means the transmission medium employed, such as TCP/IP or UDP/IP on the Internet for example or GSM for voice and data, GSDM/GPRS in packet-switched mode or UDP and TETRA.

It is important to understand that the purpose of the invention is not to allow the determination of terminals which will satisfy a request for the transmission of a chosen type of data (video for example), but to allow the determination at any time of calling and called terminals, as well as, preferably, a communication medium which will allow a caller to contact a called party directly, independently of the data type to be transmitted. In other words, the management device (D) according to the invention is in charge of the determination of the possibility to establish a connection between the user terminals, and if so to determine the communication medium which will allow the maximum number of different data types between these two terminals.

The processing module (PM) can be arranged so as to effect its determination as a function of criteria other than the aforementioned availability criteria. Among these additional (or auxiliary) criteria, one can mention in particular the accessibility of the calling and/or called users, the preference of use of a terminal by a user, the policy concerning terminal and/or use by a company, the level of communication quality, the hierarchical level of the calling and/or called users within a company, the information on geographical location of the calling and/or called users, and the security of the call.

When the processing module (PM) takes account of the accessibility of the calling and/or called users in order to effect its determination, it is preferable that the correspondence table should contain the accessibility status of the users whose identifiers are stored in the memory (M). This is not compulsory however. The processing module (PM) can in fact be arranged so as to determine this information within the private network (N). By accessibility state or status is meant here the ability or not to contact a calling and/or called user using at least one of his communication terminals. In fact it is possible to envisage that a user may not wish to be called on one of his terminals when he is at a particular location. For example, a user (Ui) does not wish to be called on his mobile telephone (TMi) when he is in a waiting room or at a show or in a vehicle. In such a case, the private network (N) places at the disposal of its users a service which allows them to indicate the terminal or terminals on which they wish to be called or which they wish to use at any given moment.

When the processing module (PM) takes account of the preference of use of a terminal by a user in order to effect its determination, it is preferable that the correspondence table should contain the information on the preference of use of the users whose identifiers are stored in the memory (M). This is not compulsory however. The processing module (PM) can in fact be arranged so as to determine this status information within the private network (N). In fact it is possible to envisage that a user may prefer to be called, or to call, with one of his terminals. In such a case, the private network (N) places at the disposal of its users a service which allows them to indicate the terminals with which they prefer or which they prefer to use. However, it is preferable that this information can also result from an analysis of the use of terminals of different types by different users of the private network (N). In this case, this statistical information is preferentially determined and supplied by the private network (N).

When the processing module (PM) takes account of the policy of use of a terminal and or of media by a company, it is preferable that it should determine the information data representing the use policy of the company within the private network (N) of this company. This is not compulsory however. In fact it is possible to envisage that correspondence table stored in the memory (M) should contain data defining the policy of use of the company. By "policy of use of the company" is meant here the rules which define, for example, the levels of priority of the terminals in accordance with their type, and/or the levels of use of the communication media in accordance with their type. This use policy can possibly be dependent upon the location of a calling and/or called user. In fact it is possible to envisaged that a company may favour communication by mobile telephone (TMi) when the user is outside of said company and/or may favour communication by fixed telephone (TFi) when the user is within said company.

When the processing module (PM) takes account of quality levels associated with the calling and/or called users, it is preferable that the correspondence table should contain information data representing said quality levels associated with the users whose identifiers are stored in the memory (M). However this is not compulsory. The processing module (PM) can in fact be arranged so as to determine this quality level information within the private network (N). In fact it is possible to envisage that the users associated with a company will have different quality levels depending on their position within the company.

When the processing module (PM) takes account of hierarchical levels associated with the calling and/or called users, it is preferable that the correspondence table should contain information data representing said hierarchical levels associated with the users whose identifiers are stored in the memory (M). This is not compulsory however. The processing module (PM) can in fact be arranged so as to determine this hierarchical level information within the private network (N). In fact it is possible to envisage that the users associated with a company will have different quality levels and/or have access to certain communication media depending on their hierarchical levels within the company.

When the processing module (PM) takes account of the geographical location of the calling and/or called users, and the topology of the private network (N) and/or of the other telecommunication networks to which it is connected, it is preferable that the correspondence table should contain information data representing said geographical locations of the users whose identifiers are stored in the memory (M). This is not compulsory however. The processing module (PM) can in fact be arranged so as to determine this geographical location information within the private network (N) and./or the other communication networks. In fact it is possible to envisage that the medium authorised by the company depends on the geographical location of the calling and/or called user in relation to the private network (N).

When the processing module (PM) takes account of the security of, the call it is preferable that it should determine the data representing security within the private network (N) and/or the other networks concerned. This is not compulsory however. In fact it is possible to envisage that the correspondence table, stored in the memory (M), contains data defining security. For example, a communication terminal can be authorised to establish intranet calls within the company, but may not be authorised to establish calls of this communication type when he is outside of the company and connected to the Internet through his mobile telephone network, because of the security policy of the company.

The processing module (PM) can also be arranged so as to transmit to a calling user (Ui) data which are representative of the medium determined for the call. Thus, the calling user (Ui) can decide to abandon his call if the medium proposed by the management device (D) is not capable of supporting the type of data which he wishes to transmit to the called users (Uj). In this event, the calling user (Ui) clears the call established with the management device (D), or indeed indicates to it that he will not be pursuing his call request. On the other hand, when the medium proposed by the management device (D) is capable of supporting the data type which the calling user (Ui) wishes to transmit to the called users (Uj), then said calling user (Ui) can indicate to the management device (D) that he accepts its proposal, and that he authorises it to order the establishment of the call which it has just proposed. The authorisation can also come from the called users (Uj). However in this case, this called user (Uj) must receive from the processing module (PM) the data representing the medium determined for the call. It is also possible to envisaged a double authorisation from the two users, Ui and Uj.

Optionally, the processing module (PM) can be arranged so as to automatically order the establishment of each call that its defines between the calling and called terminals.

The order for establishment of the defined call is sent, here, by the processing module (PM), to the access gateway (GW) of the call server (CS). This contains, in particular, the communication identifiers of the calling and/or called user which it has determined, and the communication medium that it has chosen. The sending of this order brings to an end the work of the management device (D).

In the example illustrates in the single FIGURE, for example, the processing module (PM) has decided to establish an audio call between the mobile telephone (TMi) of caller Ui and the fax/telephone (TF2) of the called user, taking account of all of the criteria employed.

On receipt of the call establishment order, the access gateway (GW) establishes, for example, a first link (L1) with the mobile telephone (TMi) of the calling party, and a second link (L2) with the fax/telephone (TF2) of the called party, in order to negotiate with its two terminals, TM1 and TF2, in accordance with the SIP procedure, the establishment of a call over a link (L3). Of course, other methods of establishing calls can also be envisaged. In the example illustrated, the calling user (Ui) is away from his office (Bi) so that link S3 is set up via the mobile telephone network, the switched telephone network, and the private network (N), but does not pass through the call server (CS).

Once the negotiation has ended, the two terminal, TM1 and TF2, are, for example, called on link L3 so as to warn their respective callers. If the call is in fact established, this brings to an end the role of the access gateway (GW).

On the other hand, if the call cannot be established, because one of the users does not pick up, then it is preferable that the access gateway (GW) should indicate this to DEVICE D. In this situation, two modes of operation can be envisaged.

In a first operating mode, the processing module (PM) sends a call failure message to the terminal with which the calling user (Ui) has placed the call request.

In a second operating mode, the processing module (PM) effects a fresh determination, and communicates a fresh order to the access gateway (GW). Optionally, it is possible to envisaged that the processing module (PM) is arranged so as to determine, for each call, a main solution and a fallback solution, so that in the event of failure of the call defined by the main solution, it immediately sends the characteristics defining the fallback solution to the access gateway (GW). Such a fallback solution can be radically different from the main solution, both regarding the terminals of the calling and/or called user and regarding the communication medium.

The management device (D), and in particular its processing module (PM), can be implemented in the form of electronic circuits, software (computer) modules, or a combination of circuits and software.

The invention is not limited to the embodiment of the management device and the call server described above as an example only, but in fact covers all variants which can be envisaged by the professional engineer in the context of the following claims.

Thus, we have described one example of implementation in which the management device according to the invention was installed in a call server of a private communication network. However this management device could be installed in a communication network, such as a server in a public communication network controlled by an operator for example (in this case, the terminals are connected to the server, directly or indirectly (via a router), and the operator controls the call establishment service, offered by the invention, on behalf of individuals or companies).

The invention claimed is:

1. A device for the management of communications between communication terminals, the device comprising:
   a memory storing the identifiers of users in correspondence with lists of at least one communication terminal identifier; and
   processing means for, on receipt of a call request to a called user from a calling user, accessing said memory in order to extract the lists of identifiers of terminals which are associated with the identifiers of said calling users and said called users, and then determining, from said extracted lists, a calling terminal and a called terminal which is likely to establish a call between the calling terminal and the called terminal which satisfies said call request of said calling user, in accordance with at least one availability criterion.

2. A device according to claim 1, wherein said processing means determine said calling terminals and said called terminals, as well as a communication medium which is suitable for said calling terminals and said called terminals.

3. A device according to claim 2, wherein said determined medium is configured to provide for the transmission of the greatest number of different types of data.

4. A device according to claim 1, wherein said processing means performs the determining in accordance with a state of availability of said calling terminals and said called terminals.

5. A device according to claim 4, wherein said memory stores said communication terminal identifiers in correspondence with said state of availability of said communication terminal identifiers.

6. A device according to claim 1, wherein the communication which satisfies said request should take place via at least one communication network presenting a state of availability of resources, wherein said processing means performs the determining in accordance with the state of availability of said communication network resources.

7. A device according to claim 1, wherein said processing means performs the determining in accordance with at least one auxiliary criterion.

8. A device according to claim 7, wherein said processing means performs the determining in accordance with the state of accessibility of the users, wherein said accessibility constitutes said auxiliary criterion.

9. A device according to claim 8, wherein said memory stores said user identifiers in correspondence with said state of accessibility.

10. A device according to claim 7, wherein said processing means performs the determining in accordance with the preferences of terminal use of the calling and/or called users, where said preferences of use constitute said auxiliary criterion.

11. A device according to claim 10, wherein said memory stores said user identifiers in correspondence with a terminal use preference.

12. A device according to with claim 7, wherein at least one of said users is associated with a company which has defined a policy for the use of terminals and/or media, and that said processing means performs the determining in accordance with said policy of use, wherein said policy of use constitutes an auxiliary criterion.

13. A device according to claim 7, wherein said processing means performs the determining in accordance with the level of quality associated with said calling and/or called users, where said quality levels constitute said auxiliary criterion.

14. A device according to claim 13, wherein said memory stores said user identifiers in correspondence with information representing a communication quality level.

15. A device according to claim 7, wherein said processing means performs the determining in accordance with the hierarchical level of the calling and/or called users, wherein said hierarchical level comprises auxiliary criterion.

16. A device according to claim 15, wherein said memory stores said user identifiers in correspondence with information representing a hierarchical level in said company.

17. A device according to claim 7, wherein said processing means performs the determining in accordance with geographical location information of the calling and/or called users, and the topology of at least one communication network in which said communication must take place, wherein said geographical location constitutes an auxiliary criterion.

18. A device according to claim 17, wherein said memory stores user identifiers in correspondence with information representing said geographical location.

19. A device according to claim 7, wherein said processing means performs the determining in accordance with connection resource availability information of at least one communication network in which said communication must take place, constituting an auxiliary criterion.

20. A device according to claim 7, wherein said processing means transmits to said calling user data which are representative of the medium determined for said call.

21. A device according to claim 1, wherein said processing means, after determination of said calling terminals and said called terminals, orders the establishment of the call between said calling terminals and called terminals.

22. A device according to claim 21, wherein said processing means orders said establishment automatically.

23. A device according to claim 21, wherein said processing means orders said establishment in the event of receiving an authorization from said calling user and or said called user.

24. A device according to claim 21, wherein said processing means determines another called terminal, and establishes another call between them to satisfy said request, and/or another communication medium, in the event that it is not possible to establish said communication.

25. A call server for a communication network comprising at least one management device in accordance with claim 1.

* * * * *